United States Patent Office 3,428,654
Patented Feb. 18, 1969

3,428,654
ALKENE SULFONATION PROCESS AND PRODUCTS
Joseph Rubinfeld, Brooklyn, N.Y., and Willem Bian Gwan Ouw, Jersey City, N.J., assignors to Colgate-Palmolive Company, New York, N.Y., a corporation of Delaware
Continuation-in-part of application Ser. No. 477,228, Aug. 4, 1965. This application May 10, 1966, Ser. No. 548,827
U.S. Cl. 260—327
Int. Cl. C07d 99/02; C07c 143/36
36 Claims

ABSTRACT OF THE DISCLOSURE

Strong sulfuric acid is used to treat sultones or sultone-containing mixtures which are obtained by sulfonation of olefins. On neutralization of the treated material an active detergent of reduced free oil content is obtained.

---

This application is a continuation-in-part of our application Ser. No. 477,228, filed Aug. 4, 1965 now abandoned.

This invention relates to production of sulfonic acids and relates more particularly to the production of detergents.

The sulfonation of long chain alpha-olefins having, for example, about 12 to 20 carbon atoms, followed by hydrolysis and neutralization to produce salts of alkene-sulfonic acids and of hydroxyalkanesulfonic acids has been described previously (as in Dutch patent application 6407958 opened for inspection Jan. 25, 1965). In these processes the sulfonation reaction is typically carried out by bringing a stream of sulfur trioxide, highly diluted with an inert gas such as air, into contact with the alpha-olefin to produce a viscous acidic product which is believed to contain alkene sulfonic acids and sultones (which are cyclic compounds containing an —OSO₂— group attached to two carbon atoms, which carbon atoms are connected to each other either directly or through intervening carbon atoms); according to the aforesaid Dutch patent, the product contains about 35% unsaturated sulfonic acid and 65% sultone. These reactions may be illustrated as follows:

$$R_1R_2R_3C\text{—}CH_2\text{—}CH\text{=}CH_2 + SO_3 \rightarrow$$

products such as alkene sulfonic acids:

or sultones:

or where $R_1$ is an alkyl radical and $R_2$ and $R_3$ are alkyl or hydrogen. The sulfonated product is then hydrolyzed and neutralized, as by treatment with strong aqueous alkali; during this procedure hydrolysis of the sultones is effected to produce hydroxyalkanesulfonic acids. The resulting neutralized product has relatively low detergent power. Its detergent power can be improved to some extent by "de-oiling" to remove the significant amount (e.g. 15–25% based on the total organic content) of water-insoluble material. Such de-oiling is an expensive and wasteful process and its use substantially increases the cost of the detergent material and the capital investment which would be required for detergent production.

In accordance with one aspect of this invention we have developed a process which makes it possible to obtain a highly effective detergent directly, without the need for a de-oiling step, from the sulfonation product of an olefin. The process is a highly economical one and lends itself to efficient continuous operation with relatively low capital investment.

One feature of this invention relates to the use of strong sulfuric acid to treat a sulfonation product of an olefin. Treatment with the sulfuric acid in accordance with this invention has been found to greatly decrease the ratio of water-insoluble pentane-soluble organic material to active organic detergent material in the product, e.g. decreasing this ratio by more than one-half, e.g., by more than 75%. The extent of the reduction will depend, all other things being equal, on the amount of unreactive alkanes and other types of saturated or unreactive materials present as impurities in the starting olefin. For example, when the starting olefin mixture has a low alkane concentration, the ratio of the water-insoluble pentane-soluble organic material (often termed "free oil") to the active sulfonated organic detergent material in the resulting product is generally less than 1:10 and preferably less than 0.7:10 (e.g., in the range of 0.2:10 to 0.7:10) and the product may, after a simple treatment with base, be used directly as a detergent of properties equal to, or better than, those of standard commercial detergents, without any de-oiling treatment. When the previously mentioned ratio (of free oil to active detergent) is calculated on the basis of the non-alkane materials in the free oil, it is even lower, since unreactive alkanes, which appear to pass through the process substantially without change, usually constitute a substantial portion of the total free oil of the products of this invention.

It has also been found that the process of this invention may be applied to olefin feed mixture having relatively high contents of alkanes and other types of saturated or unreactive materials to yield products which are surprisingly effective as detergents, even though they contain large amounts of free oil. While the presence of the unreacted alkane in the product reduces the foaming qualities of the detergent, it does not have any significant detrimental effect on its detersive power. In these products the ratio of the amount of non-alkane materials in the free oil to the amount of active sulfonated detergent material is very low, i.e., on the same order as the corresponding ratio in the detergent products made from the purer olefin cuts. The discovery of the tolerance of the products for alkanes makes it possible to use relatively impure, and therefore less costly, olefin mixtures as the feedstocks. In fact, because of their lower foaming characteristics, these detergent products are especially suitable for use in many types of automatic clothes-washing machines.

The free oil content of the products may be further reduced by a special heat-treatment, as described in our copending application Ser. No. 548,826, entitled "Heat-Treatment of Sulfonated Olefin Products," which was filed on even date herewith and whose disclosure is incorporated herein by reference.

The product is unique in its overall characteristics and properties which make it particularly suitable in the formulation of detergent compositions. As indicated, it exhibits many technical advantages including highly desirable detergent efficiency combined with other special characteristics such as foaming power, emulsification power or ability, etc.

Generally, the olefin or alkene may be an aliphatic unsaturated hydrocarbon, containing from about 5 to 30 carbon atoms and having the structure (wherein $R_1$ and $R_2$ have the meaning previously given. We may use mixtures which contain alkenes of various molecular weights, e.g., mixtures containing straight chain primary alkenes. Examples of satisfactory alkenes for use in the sulfonation process are amylene, hexene, nonene, dodecene, tetradecene, hexadecene, heptadecene, octodecene, docosene, pentacosene, and the like, as well as mixtures of said alkenes.

A preferred alkene for use in the present invention is an alkene or olefin having a terminal double bond and an essentially acyclic straight-chain structure which contains about 8 to 25 carbon atoms in the molecule. These α-olefins or 1-olefins may consist essentially of a single compound or mixtures of said compounds, although the olefin feed also may contain secondary or internal olefins, diolefins, cyclic olefins, aromatics, naphthenes, and as indicated above, alkanes. Monoolefins having the structure (where $R_1$ and $R_2$ have the meaning previously given) preferably constitute at least 3/4, still more preferably more than 5/6, and even more preferably more than 9/10 of the feedstock. Best results have thus far been obtained when α-olefins (where $R_2$ is H) constitute a major proportion, e.g., above 70% and preferably at least 90%, of the feedstock. A particularly preferred olefin feedstock contains in the range of about 12 to 21 carbon atoms in the molecule and yields alkenyl sulfonates having excellent detergency properties. Especially good foaming and detersive characteristics have been obtained by the use of a feedstock whose alpha-olefin content consists essentially of compounds of 15 to 18 carbon atoms. Olefin sulfonates made from olefin feedstocks containing substantial amounts (e.g., over 15%) of olefins having 19 and 20 carbon atoms do not perform as well as those made from the $C_{15}$–$C_{18}$ cut.

Generally, the alkene or olefin feed materials may be derived from primary, secondary and tertiary alcohols by dehydration, or from halogenated hydrocarbons by dehalogenation, or from saturated hydrocarbons through cracking or catalytic dehydrogenation or by polymerization of olefins such as ethylene, butylene, propylene and the like. Particularly satisfactory materials may be obtained by cracking petroleum wax or catalytic polymerization of ethylene. The latter processes produce essentially acylic straight-chain compounds which upon sulfonation and neutralization result in readily biodegradable alkene sulfonates. Another method of making the alkene is by dehydration of long chain fatty alcohols.

Advantageously, the initial sulfonation reaction involves treatment of the olefin with sulfur trioxide, and may be carried out in a manner known in the art, as by feeding a stream of sulfur trioxide highly diluted with inert gas (e.g., an inert gas: $SO_3$ mole [volume] ratio of 5:1 to 100:1, preferably less than about 10:1, e.g., 50:1 to 20:1) into contact with a stream of the olefin feedstock. In the preferred embodiment in which the sulfonation is effected directly with $SO_3$ rather than with a complex thereof, the mole ratio of $SO_3$ to olefin is advantageously about 1:1; that is, about one mole of $SO_3$ is absorbed per mole of olefin feed. At a mole ratio of 1.3:1 the amount of sulphonic acid in the intermediate product (before sulfuric acid treatment) is somewhat higher than that obtained at 1:1 ratios but the final product is considerably more darkly colored. It is also within the scope of this invention to use mole ratios of $SO_3$ to olefin of substantially less than 1:1, e.g., 0.5:1; with these ratios it is believed that the final product after sulfuric acid treatment probably contains higher alkyl sulfates in substantial amounts and is therefore somewhat different chemically from the final product obtained at the mole ratios in the neighborhood of 1:1.

Among the inert gases which may be used for dilution of the sulfur trioxide are air and nitrogen, which are preferred, carbon dioxide, sulfur dioxide, low molecular weight paraffinic hydrocarbons, etc. The gaseous sulfur trioxide may be provided by vaporizing a stabilized liquid sulfur trioxide or by using converter gas obtained from a sulfur burner. Undiluted $SO_3$, e.g., at low subatmospheric pressures corresponding to the $SO_3$ partial pressures in the $SO_3$-diluent mixtures, may be used.

When liquid sulfur trioxide is used as the sulfonating agent, it is preferred to use a liquid diluent such as sulfur dioxide, carbon tetrachloride, hexane, etc. to minimize local overheating and prevent undesirable side reactions such as oxidation and polymerization.

In carrying out the initial $SO_3$-olefin reaction, it is advantageous to maintain intimate contact between a supply of gaseous $SO_3$ and the olefin. This may be conveniently effected in a continuous manner by exposing to the $SO_3$ one or both faces of a thin flowing film of olefin, as by passing the thin film of olefin down the wall of a tube into the inner portion of which the $SO_3$ is injected. In another type of reactor the olefin passes continuously through an annular zone between the outer surface of a cylindrical rotor and the inner wall of a cylindrical vessel coaxial therewith, while the diluted $SO_3$ is injected into that zone from many ports spaced along the length and around the circumference of that zone. Alternatively, the $SO_3$ may be injected into a dominant liquid bath of the olefin maintained under vigorously agitated or turbulent conditions, or fine droplets of the olefin may be dispersed in a gaseous stream of $SO_3$ and inert gas. Continuous sulfonation is presently preferred over batch processing, because it has thus far given improved efficiency and higher quality products.

During the initial $SO_3$-olefin reaction the temperature is advantageously maintained below 60° C., a temperature of less than about 50° C. and, when feasible, not above about 40° C. (e.g. within the range of about 10–40° C.) being preferred. It is usually desirable to work at a temperature at which the sulfonated material produced by the reaction remains in liquid condition. Accordingly, the choice of a particular temperature is in part dependent on the particular olefin used, since the sulfonated products of higher molecular weight, e.g., those made from $C_{20}$ olefins, will tend to precipitate out of the mixture more readily, at low temperatures, than the lower molecular weight sulfonated products (e.g. those made from $C_9$ olefins). In general, it is desirable to use as low a temperature as possible, e.g., a temperature which is 5° C., or less, above the temperature at which freezing or precipitation takes place. Since the reaction between the $SO_3$ and the olefin is exothermic, it is advantageous to use suitable cooling means; thus, cooling may be effected by passing a cooling medium, such as water, through a jacket surrounding the tubular reactor in which the $SO_3$-olefin reaction takes place.

The gaseous effluent leaving the reactor after the contact between the $SO_3$ and olefin is generally substantially free of $SO_3$, and consists practically entirely of the inert gas, together with a very small amount of $SO_2$ and some entrained reaction mixture.

The product of the initial sulfonation reaction (hereinafter termed "Stage I mix," for convenience) is usually a dark brown viscous material, having an appearance similar to a melted chocolate bar. Typical Stage I mixes, made with a 1:1 $SO_3$:olefin mole ratio, contain in the neighborhood of about 35 mole percent active ingredients (based on moles of olefin and measured by titration of the acidic mix with a standard cetyl trimethylammonium bromide solution); on heating with aqueous caustic, to effect neutralization of the sulfonic acids and hydrolysis, by ring-opening, of some of the sultones, this proportion rises to about 70% or higher. The neutralization and hydrolysis reaction requires an extended period of time; if the sulfonation product is heated with aqueous sodium hydroxide for a shorter period, e.g., a half-hour at 98° C., to produce a material having a neutral or basic pH, the pH changes on storage and the material may become strongly acidic on standing for several days.

When a typical Stage I mix is heated (e.g, to 90–100° C. for 20 minutes), in an attempt to increase the yield of active ingredient, there is substantially no increase in the yield.

In the preferred process of the invention, sulfuric acid is incorporated into the Stage I mix. Advantageously, the sulfuric acid is supplied as a separate steam, being added as an aqueous solution (e.g., a 60% sulfuric acid solution) or as 100% sulfuric acid or as oleum (e.g., 65% oleum). 20% oleum has given excellent results, as has sulfuric acid supplied as a 90% or 97% solution; the latter are preferred over the oleum because of economy in use of material and production of lighter colored products. The optimum quantity of sulfuric acid incorporated in this stage of the process is dependent on the reaction conditions in this stage and in the initial stage. Generally, the amount of added sulfuric acid will be in the range of about 2 to 300 parts by weight per 100 parts of Stage I mix. For Stage I mixes made with 0.8–1.2 mole of $SO_3$ per mole of olefin the amount of added sulfuric acid is preferably in the range of 2 to 100, e.g., 2 to 50 parts by weight per 100 parts by weight of Stage I mix. Even when a 60% $H_2SO_4$ aqueous solution is employed, the amount of water supplied in the added acid is small, e.g., less than 10% of the weight of the Stage I mix; in the preferred process it is less than 5%, usually less than 3%. Thus, the sulfuric acid treatment takes place under substantially non-hydrolyzing conditions, in contrast to treatment in dilute aqueous medium.

The sulfuric acid treatment is preferably effected at a temperature sufficient to keep the mixture in a flowable state. The temperatures may, for example, be in the range of about 10 to 100° C., preferably in the range of about 25 to 60° C. The duration of the sulfuric acid treatment is advantageously relatively short, preferably less than about an hour, best results being obtained with times of less than about 20 minutes, e.g., 5 minutes or less. Good results have been obtained even when the sulfuric acid was injected into the Stage I mix less than one minute before the mixture was brought into contact with an alkaline neutralizing agent (e.g. excess aqueous NaOH); in one run the Stage I mix was blended with the sulfuric acid and heated to about 55° C. during a period of about 13 seconds and then directly neutralized.

The addition of the sulfuric acid may be effected in any suitable apparatus, preferably one in which the ingredients are mixed together thoroughly and quickly. One suitable technique for continuous operation is to feed the Stage I mix and sulfuric acid to a recycle loop. This may be a continuous loop of tubing having a inlet at one point through which the ingredients are fed continuously (preferably a pump to which both the Stage I mix and sulfuric acid are supplied continuously), and an outlet, at another point, through which the product is removed continuously, the total rates of feed and withdrawal (which are substantially equal) being each only a fraction (e.g. less than 1/5) of the rate at which the mixture is passed through the loop; thus the material recycles many times in the loop and the composition of the withdrawn material is substantially the same as that of the material circulating throughout the loop. The sulfuric acid treatment is an exothermic reaction; if desired, the material may be cooled in the recycle loop. Good results have also been obtained when the sulfuric acid was injected into the Stage I mix while the latter was passing through the sulfonation apparatus; e.g. when a tubular falling film tower was employed, as previously described, with the olefin and diluted $SO_3$ fed to the top of a vertical tube 20 feet high, the sulfric acid was injected at a point halfway up the tube. Still another method for carrying out the treatment is to be feed the sulfuric acid and Stage I mix to a pump at one end of a length of tubing leading, without recycling, to a neutralization zone.

The appearance of the sulfuric acid-treated material is similar to that of the Stage I mix; that is, it is a viscous dark material, again like a melted chocolate bar.

After the treatment with the sulfuric acid, which as previously pointed out may be very brief, the treated material is preferably fed directly into contact with a basic material to neutralize it. It is, however, within the broader scope of this invention to give the material an intermediate treatment, preferably a thermal treatment, which may be effected in aqueous medium, prior to neutralization. Thus, after treatment with sulfuric acid under non-hydrolyzing conditions and in the presence of little or no water, the material may be mixed with water, or with dilute sulfuric or other acid, and heated (e.g., to 100° C. or higher, e.g. 150–200° C. under superatmospheric pressure) before neutralizing it my contact with a basic material.

The treatment with base may be carried out on a batch or continuous scale. Advantageously, it is effected by thoroughly mixing the acidic product with a basic material and water, e.g. with a 10, 20, 30, 40 of 50% aqueous solution of sodium hydroxide and, conveniently, maintaining the mixture at an elevated temperature above 60° C., e.g. in the range of about 65–200° C. (using superatmospheric pressures for the higher temperatures, when needed), preferably in the range of about 90–100° C. The neutralization goes to completion much more rapidly for the sulfuric acid treated material than for the Stage I mix, previously described. Neutralization times well under an hour may be employed, e.g., ½ hour or less without the danger of the gradual auto-acidification of the product on storage. Generally, the alkali is used in amount such that the pH of the resulting aqueous solution is about 10 or higher; this makes for easier manufacturing control than the use of an amount precisely sufficient to give a pH of 7 or 8. When the sulfuric acid treatment is effected under such conditions as to produce a treated material having a very low sultone content, the alkali treatment conditions are preferably made less drastic; for example, the alkali treatment may be effected at room temperature with short contact times.

The product of the aqueous base treatment is generally a syrupy liquid when the starting olefin includes an appreciable proportion of olefins of less than eighteen (e.g., 15) carbon atoms. In this case, unlike the slurries formed on neutralization of alkyl benzene sulfonic acids, there are substantially no undissolved particles. With suitable mixtures, e.g., obtained from feeds comprising $C_8$–$C_{22}$ olefin mixtures or $C_{15}$–$C_{18}$ olefin mixtures, free-flowing viscous syrups free of solid particles are obtained even at high solids contents (well above 40%, e.g., at 60% solids).

While the mechanism of the sulfuric acid treatment reaction is not understood, it is believed that, in the concentrated sulfuric acid medium, the sultones formed in the initial $SO_3$ reaction may be converted to active sulfonic acid. This has been confirmed by sulfuric acid treatment of sultones isolated from the Stage I mix. It has been found that the sulfuric acid treatment converts to anionically active ingredient even those sultones which are practically completely resistant to hot alkaline treatment. The same studies show that the sulfuric acid treatment significantly reduces the amount of ordinary insoluble and inactive hydroxyalkane sulfonates which are ordinarily formed on the base treatment of the Stage I mix. Infrared analyses of Stage II mix (frozen, at Dry Ice-acetone temperature, directly after its preparation and before neutralization) indicate that it contains a relatively high proportion of delta sultones and that little, if any, gamma sultone is present, the ratio of delta sultones to gamma sultones being well above 1:1, e.g., above 3:1, preferably above 4:1; this was confirmed by studies in which the various sultones were recovered by extraction. Also, conversion of unreacted olefin in the Stage I mix to sulfur-containing products probably takes place during the sulfuric acid treatment; the unsulfonated hydrocarbons present in our neutralized product have a much lower olefin percentage than that of the hydrocarbons present in the neutralized hydrolyzed Stage I mix. In any event, the sulfuric acid-treated product gives, after the neutralization treatment, a material having a much lower proportion of the insoluble oil and, more importantly, the neutralized product from sulfuric acid-treatment can be used directly as a highly active detergent material without the need for any deoiling step.

Another advantage of the process of this invention is that in the sulfuric acid treatment, which is effected in the presence of little or no water, the reaction mixture is much less corrosive than sulfuric acid-containing mixtures in which large amounts of water are present. This makes it possible to carry out the sulfuric acid treatment in ordinary steel equipment. Also, the reaction mixture is generally substantially free of HCl or other corrosive chlorides.

The neutralization products produced in accordance with this invention generally contain minor proportions of hydroxysulfonates, which may be present owing to incomplete conversion of sultone during the sulfuric acid treatment and resultant hydrolysis of the sultone to hydroxysulfonate. The proportions of hydroxysulfonate are well below those reported in the literature; thus, the Dutch patent previously cited refers to the conversion of the 65% sultone content to hydroxysulfonate, Kaiser and Puschel, Chem. Ber. 97 (1964), page 2929, state that gamma sultone is converted, on hydrolysis, 67% to hydroxyalkane sulfonate, and British Patent 983,056 (pub. Feb. 10, 1965) refers to a product containing 40% hydroxyalkanesulfonate and 50% unsaturated sulfonate, which is roughly consistent with a 67% conversion of a 65% sultone content to hydroxyalkane sulfonate. Unlike the processes described in the literature, in which the treatment of the Stage I mix is effected under essentially hydrolytic conditions, the treatment with concentrated or strong sulfuric acid, effected under substantially anhydrous conditions (as illustrated in the following examples), results in a considerable reduction in the ratio of hydroxyalkane sulfonate to alkenesulfonate; generally less than ⅓ (e.g., about ⅕) of the total anionic active content is hydroxyalkanesulfonate. Example 10 illustrates this point most clearly. (When certain conditions of treatment are employed, as illustrated in Example 11 for instance, the product contains substantially no hydroxyalkanesulfonate.)

Oxidative cleavage studies of the neutralized product indicate that its alkenyl sulfonates are predominantly Δ-3,4; for example, oxidative cleavage studies made on the alkenyl sulfonates obtained on sulfonation, in accordance with this invention, of an olefin cut consisting substantially completely of $C_{18}$ hydrocarbons indicate that, of the total alkenyl sulfonates, about 65–70% was Δ-3,4, about 10–13% was Δ-4,5 and about 10–13% was Δ-2,3.

As mentioned above, the unsulfonated hydrocarbons remaining in the products of this invention usually have a relatively low olefin content. In typical products made from olefin mixtures of low alkane content, the olefin content of these unsulfonated hydrocarbons is well below 60%, and is made up principally of trans olefins, as demonstrated by infrared spectrographic analysis, and the total hydrocarbon content of the neutralized product is below about 5% (on an organic dry basis). For products made from olefin mixtures of higher unreactive alkane content, the total amount of hydrocarbons in the neutralized product is correspondingly higher due to the presence of unreacted paraffins, and the relative proportion of olefins to total hydrocarbons is correspondingly lower. Thus, in one typical free oil (from a neutralized product produced in accordance with this invention and containing 11.7% free oil based on the content of anionically active material) the hydrocarbons constituted over 80% of the total free oil, the other constituents being sulfur-containing intermediates, and paraffins constituted the major portion of these hydrocarbons.

The color of the material produced in accordance with this invention will depend in part on the impurities in the feedstock. Some feedstocks, such as certain relatively unrefined cracked paraffin waxes (which feedstocks, although high in alpha olefins, have substantial alkane contents) are changed from their original yellow color to a dark brown on contact with a single drop of $SO_3$ (for 120 grams of feedstock) and yield darkly colored products. This color change takes place even if the feedstock has been pretreated and decolorized with suitable adsorbents. With the more highly refined feedstocks, such as those shown in Examples 2 and 14, lighter colored products can be attained. An improvement in color can also be attained by the incorporation of a small amount of an antioxidant, e.g. an amount in the range of about 0.01% to 1% of a phenolic antioxidant, in the olefin before or during the reaction. Thus, by addition of 3,500 p.p.m. of "Iphol" (2.6-di-tert-butyl-phenol) into an olefin feedstock just before the treatment with $SO_3$, the color of the final neutralized product was lowered from a value of 950 Klett (obtained without the addition of the antioxidant) to a value of 350 Klett. It is also within the scope of the invention to add the antioxidant to the $SO_3$-treated mixture, e.g., at the time the sulfuric acid is added. Antioxidants which react with $SO_3$ may be used, e.g. α-naphthol which is an antioxidant and reacts with $SO_3$ to form another antioxidant, namely, naphtholsulfonic acid. The color of the neutralized product may also be lightened by the addition of a bleaching agent. For example, the neutralized product may be treated with sodium hypochlorite; alternatively, another oxidizing bleaching agent, such as hydrogen peroxide, may be added to the Stage II mix before or after neutralization, preferably while carefully controlling the temperature below 25° C.; aqueous $H_2O_2$ e.g., of 35% concentration) may be used for this purpose. It has been found that the bleached product substantially retains its light color after heat-treatment; in this respect it is far superior to the products resulting from similar bleaching of the sulfonated olefin products of the prior art; additional details on this point are found in the copending application on "Treatment of Detergents," previously mentioned.

The following examples are given to illustrate further some aspects of this invention:

Example 1

Using a jacketed tubular reactor having an internal diameter of 0.824 inch and a length of 19′4″ as the first sulfonation stage, an alkene mixture having an average molecular weight of about 228 was continuously sulfonated with a gaseous mixture containing 4% by volume of sulfur trioxide in air. The alkene mixture contained about 88% of terminally unsaturated straight chain olefins having a chain length of about 15 to 20 carbons ($C_{15}$–16%, $C_{16}$–14%, $C_{17}$–14%, $C_{18}$–17%, $C_{19}$–21%, $C_{20}$–17%, approximately), 6% internally unsaturated branched and straight chain olefins, 3% diolefins and 3% alkanes (analysis by mass spectroscopy). In the film-type sulfonation reaction, the alkene was distributed as a falling film over the inner wall of the reaction tube at the top thereof and the gaseous sulfonating agent was injected downward at a high volumetric rate into the center of the reaction tube at the top thereof. Reaction temperature was controlled in the range of about 125° F. using 50–65° F. cooling water in the cooling jacket surrounding the reactor and the pressure in the reaction was about 10 p.s.i.g. About 40 lbs./hr. of alkene was reacted with about 14 lbs./hr. of sulfur trioxide (1:1 mole ratio of $SO_3$ to alkene) dispersed in 30 cu.ft./minute of air having a dew point of about $-100°$ F. (1 p.p.m of water).

The Stage I mix from the tubular reactor was separated continuously from entrained gases in a separator at the base of the reactor and then injected continuously into a recycle loop (of the type previously described) together with 6.5 lbs./hr. of 20% oleum, both the Stage I mix and the oleum being added continuously at a pump at the inlet of the recycle loop, and the recycling mixture in the loop was maintained at a temperature of about 105° F. The average residence time in the recycle loop was about 2–5 minutes, the pressure therein was on the order of 5 p.s.i.g., and the material continuously leaving the recycle loop was neutralized directly with aqueous dilute sodium hydroxide at a temperature of about 180–200° F. to a pH of 9–10. Analysis of the neutralized syrupy aqueous product indicated that it contained (on a dry basis) 78.3% anionic active detergent, 19.1% inorganic salt and 2.1% of material soluble in petroleum ether and insoluble in aqueous ethanol, indicating that the degree of conversion of the original alkene to anionic active detergent was about 96% mole. In contrast, neutralization of the Stage I mix in similar manner gave a product in which the degree of conversion of alkene to active detergent was about 75%.

Example 2

Example 1 was repeated using a "$C_{18}$" alpha-olefin cut which was a hydrocarbon mixture produced by anionic polymerization of ethylene and containing 93.9 mole percent olefins (of the following distribution: 1.4 mole percent $C_{16}$, 87.6 mole percent $C_{18}$, 4.9 mole percent $C_{20}$), 1.2 mole percent paraffins, 4.2 mole percent di-olefins, 0.05 mole percent triolefins and 0.7 mole percent aromatics (analysis by mass spec., as in Example 1), the average molecular weight of the olefins being 253. The rate of feed of the olefin cut was about 40.5 lbs./hr. and the rate of feed of the sulfur trioxide was about 13 lbs./hr. (the $SO_3$ concentration in the air-$SO_3$ feed being about 4 volume percent). The temperature in the first stage of reaction was somewhat higher than that in Example 1 (the exit temperature of the cooling water being about 85° F.). Instead of 20% oleum there was employed 90% $H_2SO_4$, which was supplied continuously to the recycle loop at the rate of 1.8 lbs./hr. The residence time in the recycle loop was about 5 minutes, and the temperature of the material in the loop was maintained at about 115° F. The neutralization was effected with 30% aqueous caustic soda solution at a temperature of 240° F. (heat being supplied by injection of live steam).

The slurry resulting from the neutralization had a pH of 13.5 and was analyzed, after evaporating off most of the water, to determine the total "non-volatile" or "solids" content (determined, by difference, after removing water by azeotropic distillation with Skellysolve V, a volatile petroleum fraction). This non-volatile content includes the inorganic salts, "free oil," free alkali and active anionic surfactant. In carrying out the analysis, one sample was mixed with ethanol to cause the inorganic salts to precipitate out; these were filtered off, dried at 105° C. and weighed, and then ignited at 600° C. and again weighed; the filtrate was titrated for free alkali. Another sample was taken up with aqueous ethanol and then repeatedly extracted with pentane (petroleum ether); the petroleum ether was evaporated off and the weight of the extract was reported as the "free oil." The proportion of active ingredient was determined by difference, but its proportion was checked by a standard titration of the original mixture with cetyl trimethyl ammonium bromide. The total non-volatile content of the neutralized syrupy product was 29.1%, including about 0.6% inorganic salts (about 0.5% after the ignition) about 1.4% free oil, about 0.3% free alkali (as NaOH) and about 26.8% active anionic ingredient (by difference); the cationic titration indicated an active anionic ingredient content of 25.85%. Thus the free oil content, based on the total organic content (dry basis), was about 5%. When the sulfonation was effected in a similar manner but the sulfuric acid treatment was omitted, the free oil content, based on the total organic content, was over 15%.

The ethylene glycol distillable proportion of the neutralized slurry was found to be 1.04% of the total aqueous slurry, or about 3.8% of the total organic content (dry basis). This analysis, which was conducted, on still another sample, substantially in the manner described in the Journal of the American Oil Chemists' Society, vol. 40 (1963) pp. 257–260, indicates the amount of unsulfonated hydrocarbon. It will be understood that the hydrocarbon, whose content is determined in this manner, is part of the "free oil". When the sulfonation was effected in a similar manner but the sulfuric acid treatment was omitted, the ethylene glycol-distillable portion was over 11% of the total organic content.

Figure 1:
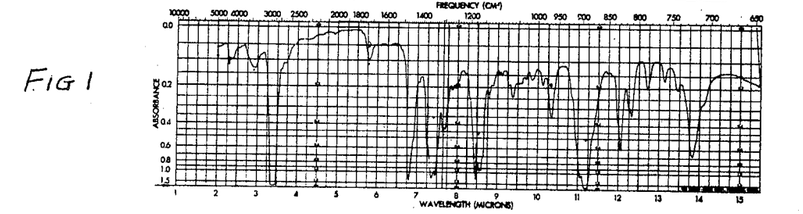
Figure 2:
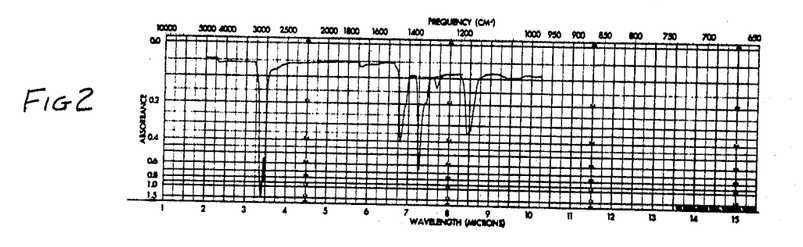

Infrared spectra of the "free oil" of this Example 2 are shown in FIGS. 1 and 2. FIG. 1, which is a spectrum of semisolid film of the material, has strong bands at about 7.35–7.45 microns (doublet) and about 8.46–8.6 microns (doublet) indicating the presence of sultones and about 7.65 and 7.7 microns (doublet) indicating the presence of delta-sultone. It also has a band at about 10.35 microns indicating the presence of trans-olefins. FIG. 2, which is a more quantitative differential spectrum of a solution of the material in carbon tetrachloride, also shows the presence of sultones (bands at about 7.25, 8.45 and 8.52 microns) and delta sultone (band at about 7.67 microns).

Figure 3:
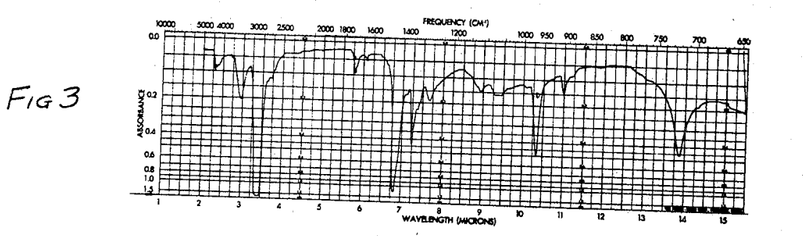

The infrared spectrum of the glycol-distillable material of this Example 2 is shown in FIG. 3, which was taken on a liquid film 0.020 mm. thick. This spectrum indicates that no significant amount of alpha-olefin is present (no absorption bands at about 11.0, 10.06, 6.06 and 3.20 microns) and that the material contains a rather large amount of trans olefin (strong band at about 10.35 microns); bands showing the presence of residual ethylene glycol (introduced in the distillation analysis), a small amount of carbonyl (5.80 microns) and saturated hydrocarbons are also present.

Example 3

Example 2 was repeated, but there were employed 3 lbs. per hour of the 90% sulfuric acid, and the neutralization was effected at 190–200° F. The free oil content of the product was about 7% of the total organic content (dry basis) while the hydrocarbon portion (that is, the glycol-distillable portion) was about 2.9% of the total organic content. A mass spectrographic analysis of the glycol-distillable portion showed 50.4 mole percent mono-olefin, 40.1 mole percent paraffin, 0.9 mole percent di-olefin, 0.3 mole percent triolefin, 0.5 mole percent aromatic and 7.7 mole percent secondary alcohols; a similar analysis of the olefin feedstock showed 1.2 mole percent paraffins, 4.2 mole percent diolefins, 0.05 mole percent triolefins and 0.7 mole percent aromatics.

Figure 4:
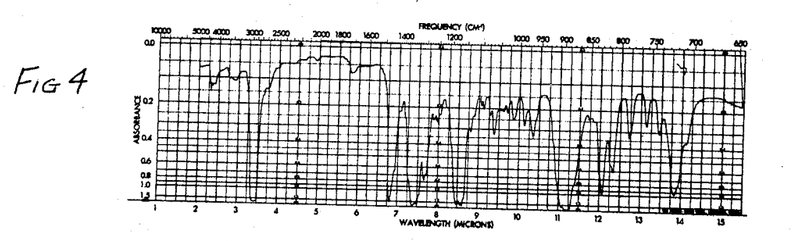
Figure 5:
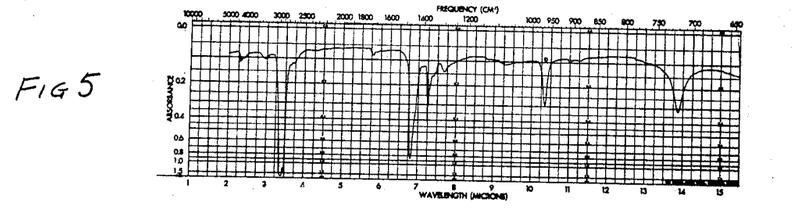

The infrared spectrum of the "free oil" of this Example 3 is illustrated in FIG. 4 (taken on a semisolid film of the material) which indicates the presence of sultones (bands at about 7.35–7.5 microns, about 8.48–8.6 microns) delta sultone (bands at about 7.65–7.72 microns) and trans-olefin (band at about 10.35 microns). The infrared spectrum of the glycol-distillable material of this Example 3 is shown in FIG. 5 (taken on a liquid film 0.020 mm. thick) which indicates the presence of a high content of trans olefin (strong band at about 10.35 microns) and only a trace of alpha olefin (11.00 micron band); saturated hydrocarbons and a trace of carbonyl (absorption at about 5.8 microns) are also present.

The desalted de-oiled active ingredient was dried and reacted with n-octylamine by mixing a solution of the active ingredient in alcohol with the octylamine and then evaporating the alcohol on a steam bath to recover the octylamine salt, which was then treated with heated methylene chloride. Part of the actylamine salt (about 20%) crystallized out from the methylene chloride at room temperature; this insoluble material had a bromine number of zero (when tested as described later in this specification). This insoluble fraction of the octylamine salt was converted to the corresponding sodium salt, whose infrared spectrum indicated that it is the same compound as the compound described in Example 10B below (i.e., a compound believed to be a hydroxysulfonate but not a 2-hydroxysulfonate-1). Conversion of this octylamine salt to its sodium salt was effected by treatment with an acidic cation-exchange resin followed by neutralization with NaOH.

Figure 6:
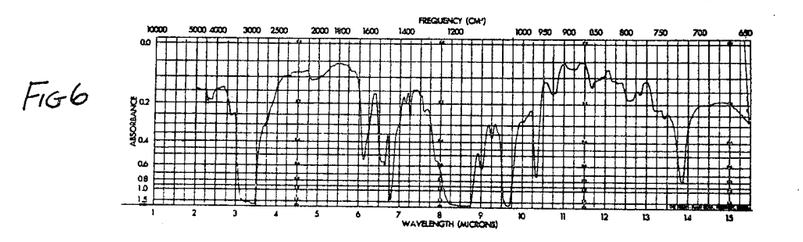

When the supernatant liquid from the first crystallization was cooled to Dry Ice temperature ($-78°$ C.), a second fraction precipitated out, as white crystals. The weight of this fraction was about 42% of the total octylamine reaction product and its bromine number (determined as described below) was 19–20, which is about 60% of the theoretical bromine number for an octylamine salt of a monoolefinic sulfonic acid of molecular weight 332 (of the sulfonic acid). The infrared spectrum of this crop of crystals (taken on a solid film of the material) is shown in FIG. 6; it has a broad strong band at about 8.25–8.75 microns and a medium strong band at about 9.6–9.7 microns, indicating that the material is a sulfonic acid or salt thereof. The spectrum has a medium band at about 10.35 microns, indicating the presence of trans unsaturation. There is no significant absorption at about 12.65 microns, which absorption would be characteristic of alkane sulfonates and hydroxyalkanesulfonates.

Figure 7:
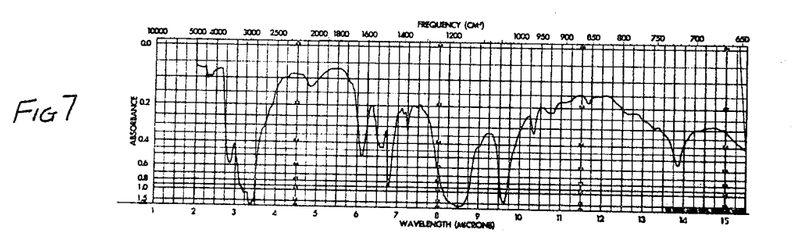

A third fraction of the octylamine reaction product was obtained by removal of the methylene chloride from the mother liquor after the $-78°$ C. crystallization. This third fraction, which constituted about 38% of the weight of the total octylamine reaction product, was a yellow wax with a bromine number of 19. Its infrared spectrum (FIG. 7, taken on a pasty film of the material) indicates that this material is a sulfonic acid or salt thereof and that it has only a small amount of trans-unsaturation (absorption at about 10.35 microns) and no alkane sulfonate or hydroxyalkanesulfonate. The relative amounts of trans unsaturation in the two unsaturated fractions (whose spectra are illustrated in FIGS. 6 and 7) were compared by more quantitative analyses of infrared spectra (taken in methylene chloride solution) and calculation of the ratio of absorptivity at 9.63 microns (indicating total amount of sulfonate) to absorptivity at 10.32 microns (indicating trans unsaturation). For the second fraction, which crystallized at $-78°$ C., this ratio was about 13–15; for the third fraction it was about 45–50.

Hydrogenation of the second fraction (which crystallized at $-78°$ C.) resulted in a product which no longer showed absorption of infrared in the band for trans unsaturation, but did show significant absorption at 12.65 microns. The hydrogenation was effected in a "Brown[2] Hydro-Analyzer" at room temperature and pressure, with hydrogen and catalyst generated in situ from reaction of sodium borohydride and acid chloroplatinic acid being used as the source of the catalyst. Similar results were obtained on hydrogenation of the total unfractionated octylamine reaction product.

Example 4

A Stage I mix, produced by use of 1 mole of $SO_3$ per mole of olefin, using the olefin mixture of Example 1, was treated with various amounts and concentrations of sulfuric acid. In each case, the sulfuric acid treatment was effected for about 5 minutes, after which the reaction product was fully neutralized by treatment with hot aqueous caustic alkali solution. The sulfuric acid was added rapidly to the Stage I mix and the blend was sheared intensively to effect thorough mixing. The results are tabulated below:

| $H_2SO_4$ added in the form of— | Wt. of $H_2SO_4$ per unit wt. of Stage I mix [1] | Temperature of reaction with sulfuric acid, °F. | Mole percent yield of anionic active ingredient in: | |
|---|---|---|---|---|
| | | | Unneutralized material | Neutralized (hydrolyzed) product, percent |
| (a) | | | 34.6 | 70.0 |
| (b) 50% aqueous $H_2SO_4$ | 0.20 | 85 | | 85.3 |
| (c) 90% aqueous $H_2SO_4$ | 0.04 | 85 | 41.0 | 85.8 |
| (d) 90% aqueous $H_2SO_4$ | 0.17 | 85 | 51.2 | 95.1 |
| (e) 90% aqueous $H_2SO_4$ | 0.26 | 85 | 52.7 | 96.6 |
| (f) 90% aqueous $H_2SO_4$ | 0.09 | 85 | 43.0 | 89.2 |
| (g) 100% $H_2SO_4$ | 1.00 | 85 | | 96.1 |
| (h) 100% $H_2SO_4$ | 2.42 | 85 | | 95.7 |
| (i) 100% $H_2SO_4$ | 3.56 | 85 | | 95.4 |
| (j) 100% $H_2SO_4$ | 4.50 | 85 | | 95.0 |
| (k) 20% oleum | 0.03 | 110 | 37.7 | 92.8 |
| (l) 20% oleum | 0.08 | 110 | 40.6 | 96.6 |
| (m) 20% oleum | 0.15 | 110 | 46.7 | 96.2 |
| (n) 20% oleum | 0.20 | 110 | 48.0 | 96.3 |
| (o) 20% oleum | 2.04 | 110 | 65.6 | |

[1] In reporting "wt. of $H_2SO_4$," the amount of water in the acid was not included (when aqueous sulfuric acid was used), but the amount of $SO_3$ was included and calculated as $H_2SO_4$ (when oleum was used).

Example 5

This example illustrates the use of another, less efficient, method of carrying out the initial sulfonation reaction and shows the improvement on sulfuric acid treatment of the resulting Stage I mix.

Into a 1-liter 3-necked flask equipped with a dropping funnel for the sulfonating agent, a glass stirrer and a thermometer was placed 28 grams (0.12 mole) of the olefin cut of Example 2, and 104 grams to carbon tetrachloride. During a period of 30 minutes, 9.5 grams of liquid sulfur trioxide (1:1 $SO_3$:olefin mole ratio) was added dropwise with stirring. The sulfonation reaction temperature was controlled at about 70° F. by cooling the flask. Thereafter, 4.8 grams of 20% oleum were added to the resulting Stage I mix with agitation during a 5-minute period. Temperature of the oleum treatment was controlled at about 70° F., using water cooling. Subsequently, the reaction mixture was digested for 10 minutes, at 78° F. Thereafter, neutralization of the acid reaction mixture was carried out by addition of sodium hydroxide solution with agitation at a temperature of about 180° F. to a pH within the range of 9–11. Residual carbon-tetrachloride was evaporated from the aqueous sulfonate mixture. Analysis of the product showed it to contain approximately 73% of anionic active material and about 27% free oil and tar. In contrast, neutralization of the Stage I mix, without the sulfuric acid treatment, gave a product containing 37% active ingredient and 63% free oil and tar.

Example 6

The following example illustrates the use of a lower ratio of sulfur trioxide to olefin in Stage I.

The initial sulfonation reaction of Example 1 was repeated except that the molar ratio of sulfur trioxide to olefin was 0.6:1 and the temperature of the reaction of these two components was 120° F. Portions of the resulting Stage I mix were treated for 5 minutes with various amounts of 90% sulfuric acid, and then fully neutralized with hot aqueous caustic soda. The following results were obtained:

| Wt. of $H_2SO_4$ (anhydrous basis) added to Stage I mix | Temperature of reaction with $H_2SO_4$, ° C. | Mole percent yield (mole percent olefin converted to active anionic ingredient) | Ratio of free oil to active anionic ingredient in neutralized product |
|---|---|---|---|
| (a) None | | 47 | 0.63 |
| (b) 0.12 | 20–25 | 63 | .4 |
| (c) 0.24 | 20–25 | 77 | .2 |
| (d) 0.36 | 20–25 | 82 | .18 |
| (e) 0.36 | 45 | 81 | .22 |
| (f) 0.72 | 45 | 82 | .18 |
| (g) 1.20 | 45 | 79 | .2 |

Infrared spectroscopy indicates the free oil of the foregoing run (a) contains alpha-olefin and trans-olefin, while the free oil from run (d) is high in trans-olefin and contains only small amounts of alpha-olefin. In contrast to the previously described products of sulfonations in which the initial $SO_3$:olefin ratio was about 1:1, the neutralized hydrolyzed sulfuric acid-treated products of this Example 5 probably contain quite substantial quantities of long chain alkyl sulfates in addition to the long chain alkenyl sulfonates.

Figure 12:
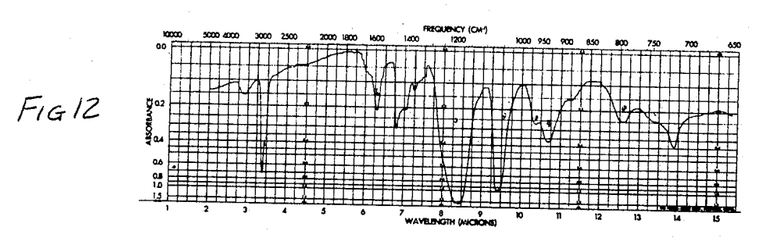

A sample of the neutralized product of run (d) was treated to remove the free oil by taking up the product in 50% aqueous ethanol, extracting the solution six times with redistilled petroleum ether at room temperature, and evaporating the raffinate to dryness under vacuum. The infrared spectrum (FIG. 12, taken on a solid film, in a frustrated multiple internal reflection apparatus with the film on one side of the prism) of the residue shows strong absorption at about 10.7 microns and absorption at about 10.35 microns, and indicates that there is present appreciable long chain alkyl sulfate (presumably of about 18 carbon atoms, like the olefin feed), as well as trans-alkenesulfonate.

Figure 13:
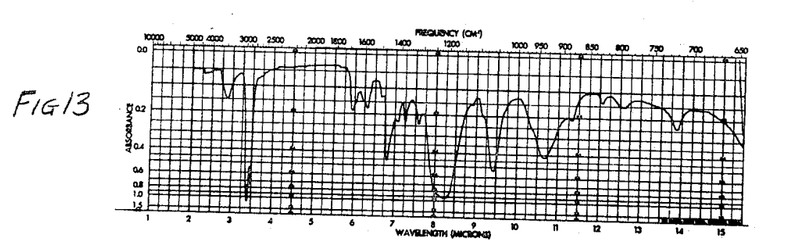

The isopropanol-soluble was isolated from another sample of the product of run (d) (by extracting 1 gram of sample three times, each time with 50 ml. of boiling isopropanol, and evaporating the extracts to dryness under vacuum at 60–70° C.). The infrared spectrum of the product (FIG. 13, taken on a film evaporated from a methanol solution) shows the presence of long chain alkyl sulfate and alkenesulfonate but practically no sultone (i.e., well below 10% and probably less than 5% sultone; compare the spectra of sultones shown in FIGS. 8 and 9, discussed below).

The product of run (d) was tested for detergency and found to be highly active.

Example 7

(A) An olefin cut having an average molecular weight of about 224, which consisted essentially of olefins having a chain length of 12 to 22 carbons, and containing about 92% of 1-olefins and 4% of trans olefins, was given a two-stage treatment and neutralized in accordance with this invention, using a 1:1 $SO_3$:olefin mole ratio in the first stage and, in the second stage, 0.15 part by weight of 20% oleum per part of Stage I mix. The neutralized product contained 97.4% active anionic ingredient and 2.6% free oil, based on total organic content (dry basis).

(B) in a similar manner the olefin cut described in Example 1 was treated, except that there was used 0.12 part of 20% oleum per part of Stage I mix, and the neutralized product contained 97.1% active anionic ingredient and 2.9% free oil (organic dry basis as in this Example 7A).

(C) In a similar manner the olefin cut described in Example 1 was treated, except that there was used 0.09 part of 20% oleum per part of Stage I mix, and the neutralized product contained 96.1% active ionic ingredient and 3.9% free oil (organic dry basis as in this Example 7A).

Each of the foregoing neutralized materials (A, B and C) was found to be a highly effective detergent.

Example 8

The sulfuric acid-treated but unneutralized product of Example 1 was converted into the following salts by treatment with the corresponding hydroxides and water-soluble carbonates in stoichiometric excess in hot aqeuous solution; mercury, zinc, barium, potassium, calcium, lithium, aluminum, lead, chromium and magnesium. By reaction with aqueous ammonium hydroxide, and with triethanolamine, the corresponding ammonium and triethanol ammonium salts were also produced.

Example 9

The two-stage treatment was used with an olefin cut having an average molecular weight of 272 and containing 91 mole percent α-olefin, of the following approximate distribution: $C_{17}$, 3 mole percent, $C_{18}$, 26 mole percent; $C_{19}$, 31 mole percent; $C_{20}$, 26 mole percent; $C_{21}$, 14 mole percent; the balance being similar, in relative composition, to the non-α-olefin portion of Example 1. The $SO_3$:olefin mole ratio in the first stage (which was carried out continuously in the reactor described in Example 1) was 1:1 and the temperature of the olefin fed to that stage was 90–100° F. To the resulting Stage I mix there was added continuously, as in Example 1, 3 parts of 90% sulfuric per part of Stage I mix. The temperature in the recycle loop was maintained at 110° F. The caustic-neutralized hydrolyzed product contained 4 to 6% of free oil, based on total organic content (dry basis).

Example 10

A Stage I mix made as in Example 2 was subjected to a dual extraction with pentane-water at room temperature. The pentane extract was dried and concentrated under vacuum of 30 mm. HgA and cooled (on an ice bath at 0–10° C.) to precipitate a first crop of pure white crystals (M.P. 75° C.) which were then washed with cold pentane. From the mother liquor a second crop of pure white crystals (M.P. 62–64° C.) was obtained by further concentration of the pentane and cooling.

Figure 8:
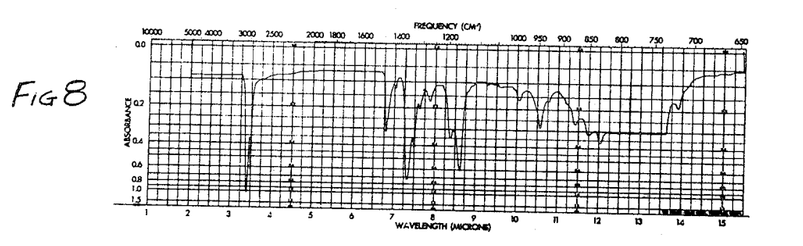

The first crop crystals had an infrared absorption spectrum as shown in FIG. 8 (a relatively quantitative differential spectrum taken on a solution in carbon tetrachloride) having strong absorption bands at about 7.35 and 8.63 microns, which are in the absorption ranges characteristic for sultones. There was substantially no absorption at about 7.65 microns (reported to be characteristic of delta sultones) or at about 11.2 microns. It is therefore believed that the first crop crystals represent a gamma sultone corresponding to the starting olefin (i.e., of about 18 carbon atoms).

Figure 9:
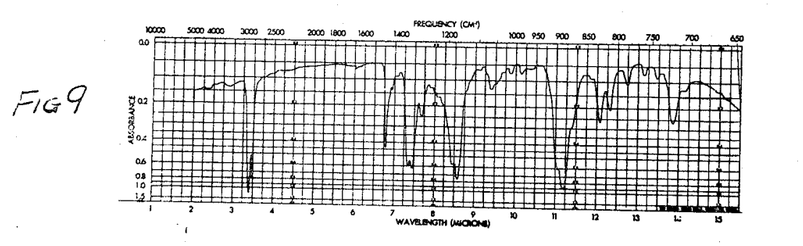

The second crop crystals had an infrared spectrum as shown in FIG. 9 (taken on a melted sample squeezed into a thin solid film) which had very strong absorption at about 7.35 microns and about 7.45 microns (doublet), at about 8.45 microns and about 8.58 microns (doublet), and at about 11.05 microns and 11.2 microns (doublet), and weak absorption at about 7.65 microns. It is believed to be a delta sultone.

(10A) One gram of the first crop crystals was treated with 1 ml. of 98% $H_2SO_4$ for less than 5 minutes at 40° C. The product was then taken up with water and its anionic active content was determined by titration with cetyltrimethylammonium bromide. The conversion to active ingredient was over 90%.

Figure 10:
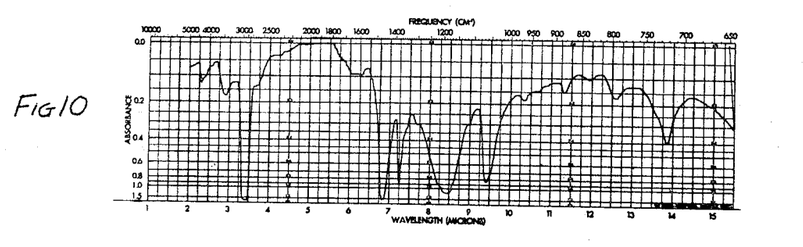
Figure 11:
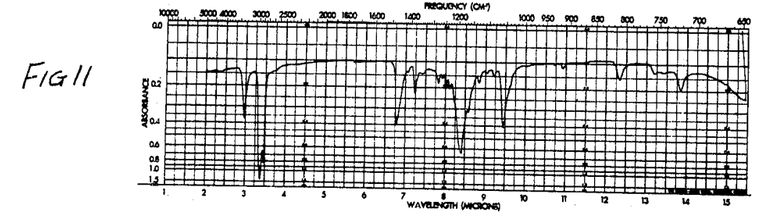

When the untitrated, sulfuric acid-treated product was neutralized, in the cold, with aqueous sodium hydroxide there was obtained a material whose bromine number (determined as described later in this specification) was about 77% of the theoretical value for a sodium alkenesulfonate having a molecular weight of 354 (i.e., 85% of theory, based on active ingredient content). Its infrared spectrum (FIG. 10) showed its sulfonate character with practically no indication of hydroxyalkane sulfonate (compare, for example, FIG. 11, discussed below); the absorption at about 10.35 microns was very small, indicating that the olefinic double bond was not trans (compare, for example, FIGS. 6 and 7, previously discussed).

(10B) A second one gram sample of the first crop crystals was treated with 5 ml. of 20% aqueous solution of sodium hydroxide for ½ hour at 100° C. On titration, as in Example 10A above, the conversion to active ingredient was found to be 30%. The other 70% of the sodium-hydroxide-treated material was found to be insoluble in the hot alkaline solution, even after dilution with 3 liters of boiling water. The insoluble solid did not melt when heated to 200° C.; from its infrared spectrum (shown in FIG. 11, and taken on a slurry in light mineral oil) it is believed to be a sodium salt of a hydroxyalkanesulfonic acid (but not of a 2-hydroxyalkanesulfonic acid-1) corresponding to the starting olefin (i.e., of about 18 carbon atoms). Its spectrum shows absorptions at about 8.5 microns and at about 9.45 microns, indicating its sulfonic acid or sulfonate nature, and absorption at about 2.95 microns indicating its pronounced hydroxyl content.

When Example 10B was repeated, using a more highly purified sample (M.P. 79° C.) of the first crop crystals, the treatment with sodium hydroxide gave substantially complete conversion to the insoluble solid and substantially no yield of water-soluble active ingredient.

(10C) A third one gram sample of the first crop crystals was treated with water. Even when the treatment was carried out at the boil there was no conversion to active ingredient.

(10D) Another one gram sample of the first crop crystals was treated with 50% sulfuric acid for ½ hour at 40° C. There was no conversion to titratable anionic active ingredient.

(10E) A one gram sample of the second crop crystals was treated with 1 ml. of 98% $H_2SO_4$ for less than 5 minutes at 40° C. The product was then taken up with water and its anionic active content was determined by titration with cetyltrimethylammonium bromide. The conversion to active ingredient was over 90%.

(10F) Another one gram sample of the second crop crystals was treated with 5 ml. of 20% aqueous solution of sodium hydroxide for 2 hours at 100° C. On titration as in Example 10A above, there was found to be no conversion to anionically active ingredient. When the time of treatment was extended to 5 hours (using a more highly purified sample, of melting point 65° C.) there was a 7% conversion to active ingredient.

Figure 14:
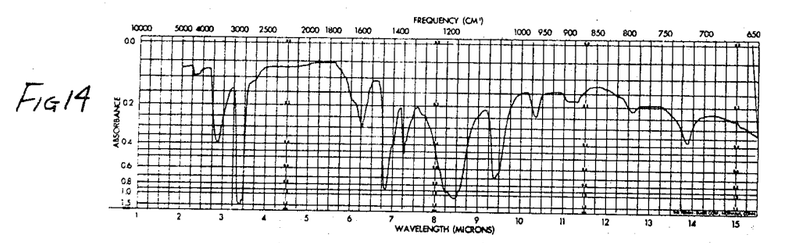

(10G) The solid material remaining after treatment as in Example 10F above, was recovered substantially unchanged as shown by comparison of its infrared spectrum and melting point with those of the starting material used in Example 10F above. When this recovered material was treated with sulfuric acid as in Example 10E above, the conversion to anionic active ingredient was found to be 89.5% (after cold neutralization with dilute sodium hydroxide). Dilution of the deeply colored sulfuric acid reaction mix with water gave a clear waterwhite foamy solution. When the sulfuric acid-treated product was neutralized in the cold, there was obtained an unsaturated product whose infrared spectrum (FIG. 14) indicated that it was an alkene sulfonate with strong absorption at about 10.35 microns, showing the presence of trans olefinic bonds.

(10H) Crystals of a 16 carbon sultone (believed to be a delta sultone) were recovered from a Stage II mix produced by treatment, in accordance with this invention, of hexadecene-1. This sultone had a melting point of about 59° C. and its infrared absorption characteristics were characteristic of the delta sultones and very much like those of the second crop crystals mentioned previously in this example. When treated with aqueous sodium hydroxide as in Example 10F there was similarly substantially no conversion to anionically active ingredient. 20 grams of the unchanged 16 carbon sultone (after recovery from the sodium hydroxide treatment and repurification) were then melted at about 55–60° C. and mixed with 2 ml. of 90% sulfuric acid with vigorous stirring, immediately poured into a boiling aqueous solution of sodium hydroxide (at atmospheric pressure). After 15 minutes of boiling, the resulting solution was cooled and titrated for anionically active ingredient. The conversion to such active ingredient was found to be substantially quantitative.

Example 11

A Stage II mix was made from the olefin described in Example 2, using, in the second stage of reaction, 5 pounds per hour of 97% $H_2SO_4$ and 54 pounds per hour of Stage I mix. 59 parts of the Stage II mix was frozen, held overnight, and then mixed with an additional 15 parts of 97% $H_2SO_4$ at 40° C. for 30 minutes and then neutralized by mixing with an excess of aqueous 15% solution of sodium hydroxide at room temperature, without heating. When the product was treated (as in Example 3) to form the octylamine salt, the latter was found to be substantially free of hydroxysulfonate (i.e., its content of the saturated fraction crystallizing out at room temperature was substantially zero).

Example 12

In this example, there were used the apparatus and process described in Example 1, with a crude $C_{15}$–$C_{20}$ olefin feedstock made by cracking paraffin wax and having the following analysis, as reported by the supplier:

|  | Percent |
| --- | --- |
| Acyclic monoolefins | 84 |
| Diolefins and naphthenic olefins | 9 |
| Paraffins and naphthenes | 5 |
| Cyclic diolefins and dicyclic olefins | 1 |
| Aromatics | 1 |

92% of the acyclic monoolefins were alpha-monoolefins. The average molecular weight of the monoolefin portion was about 240 and the distribution of olefins was 2% $C_{14}$, 18% $C_{15}$, 20% $C_{16}$, 21% $C_{17}$, 18% $C_{18}$, 16% $C_{19}$, 5% $C_{20}$. This feedstock was supplied at the rate of 40 lbs./hr., the $SO_3$ was supplied at the rate of 15 lbs./hr. and concentrated sulfuric acid (97% $H_2SO_4$) was supplied at the rate of 5 lbs./hr. at a point halfway up the tubular reactor (at a point where the reactor temperature was 120° F.). After hot neutralization with excess aqueous caustic soda, there was obtained a freely flowing slurry having a solids content of 50.9%; its content of anionically active ingredient was 37.5% and its content of free oil was about 3% (i.e., less than 10% free oil based on amount of anionically active ingredient).

Example 13

In this example, a differently constructed reactor was used for the treatment of the crude $C_{15}$–$C_{20}$ olefin feedstock described in Example 12. The feed rates were as follows: olefin feedstock, 40.2 lbs./hr.; $SO_3$ 14.0 lbs./hr. The $SO_3$ was supplied in air at a concentration of 4% by volume and at a pressure of 25 p.s.i.g. In the reactor, the olefin passed continuously through the annular zone between the outer surface of a cylindrical rotor (mounted on a vertical axis) and the surrounding inner wall of a cylindrical vessel coaxial therewith while the diluted $SO_3$ was injected into that zone from many ports spaced along the length and around the circumference of that zone. The rotor was 5 feet high and 3 inches in external diameter; the outer surface of the rotor had spaced helical ridges of polytetrafluoroethylene which extended to within 0.02 inch of the cylindrical inner wall of the vessel; the clearance between the main unridged portions of the outer surface of the rotor and that inner wall was 0.2 inch; the olefin was fed in at one end of the apparatus and the sulfonated product was taken off from the other end. The reactor temperature was about 150° F. The resulting Stage I mix was mixed with 1/10 its weight of $H_2SO_4$ (supplied as 90% $H_2SO_4$) and treated as in Example 4. The neutralized product contained (on a dry basis) about 82% anionically active ingredient and about 7% free oil.

anionically active ingredient and 2.9% free oil was then used for preparing a series of heavy duty built liquid detergents having the compositions shown in the following table:

|  | (1) | (2) | (3) | (4) | (5) | (6) | (7) | (8) |
|---|---|---|---|---|---|---|---|---|
| Olefin sulfonate (proportion given is the amount of anionically active ingredient) | 9 | 7 | 15 | 12 | 10 | 12 | 5 | 6 |
| Potassium xylene sulfonate | 8.5 | 6 | 8.5 | 8.5 | 8 | 8 | 8.5 | 8.5 |
| Sodium salt of ethoxylated linear $C_{14}$–$C_{18}$ alcohol made from three moles of ethylene oxide per mole of the alcohol (Alfol 1418 3EO) | 6 | | | | | | | |
| Lauryl-myristyl dimethylamine oxide | | 5 | | | | | | |
| Lauric-myristic diethanolamide | 2 | | 6 | 4 | | | | |
| Lauric-myristic isopropanolamide | 2 | | | | | | | |
| Carboxymethyl cellulose (sodium salt) | 0.25 | 0.25 | 0.25 | 0.25 | 0.25 | 0.25 | 0.25 | 0.25 |
| Polyvinyl alcohol | 0.25 | 0.25 | 0.25 | 0.25 | 0.25 | 0.25 | 0.25 | 0.25 |
| Aqueous emulsion of hydrogenated castor oil, containing 10% of the hydrogenated castor oil | 6 | 6 | 6 | 6 | 6 | 6 | 6 | 6 |
| N-higher alkyl (mixture of $C_{12}$, $C_{14}$, $C_{16}$) dimethylbenzylammonium chloride (Hyamine 3500) | | | | | | | 1.5 | |
| Sodium tallow alcohol sulfate | | | | | | | | 3 |
| Condensate of 10% ethylene oxide with 90% hydrophobic reaction product of propylene oxide and propylene glycol (Pluronic L61) | | | | | | | 2 | |
| Na salt of monosulfonated linear tridecylbenzene | | | | | | | | 9 |

In the above table the proportions given are percentages, by weight, of the named ingredients. Water (and a small amount of dye and fluorescent brighteners) were included in amount sufficient to make a total of 100%.

Other formulations made from the olefin sulfonate of this example include an all-purpose liquid cleaner containing an amount of the neutralized syrup sufficient to supply 4.3% of anionically active ingredient, 3% lauric-myristic diethanolamide and 10% tetra-potassium pyrophosphate; and a dishwashing liquid containing an amount of the neutralized syrup sufficient to supply 25% of anionically active ingredient, and 3% lauric-myristic diethanolamide.

Example 14

A Stage II mix was produced as in Example 1, but using an olefin feedstock which contained about 88% of terminally unsaturated straight chain olefins having an average molecular weight of 230 and an average chain length of about 15 to 18 carbons ($C_{15}$–24%; $C_{16}$–29%, $C_{17}$–30%, $C_{18}$–17%, approximately), and had a boiling range at atmospheric pressure of about 265–300° C. (with 11% residue). To the Stage II mix (i.e., the material just before neutralization) there was added 5% (based on the weight of the Stage II mix), of aqueous 35% hydrogen peroxide. After neutralization with aqueous sodium hydroxide, the color of the product was markedly lighter than that of a similar product made without the hydrogen peroxide treatment.

Example 15

270 parts of a hot neutralized slurry (having a temperature of 180° F.) produced as in Example 12 was mixed with 6¼ parts of an aqueous 3.75% NaOCl solution and allowed to stand for ½ hour. The product had a Klett color (measured after dilution with water to reduce its content of anionically active ingredient to 5%) of 305 as compared to a similarly measured Klett color of well over 900 for the product before NaOCl treatment. When the amount of NaOCl solution was increased to 25 parts, the Klett color of the product was 150.

Example 16

The olefin feedstock of Example 14 was treated with $SO_3$ and sulfuric acid as in Example 1 and neutralized as in Example 1. The resulting neutralized product, which was a syrup containing (on an organic dry basis) 97.1%

Example 17

Hexadecene-1, 99% pure, was treated as in Example 1, using an $SO_3$:olefin feedstock mole ratio of 1.1:1 and injecting the $H_2SO_4$ (as aqueous 97% $H_2SO_4$) continuously halfway up the tubular reactor, in amount of 1/10 part of the 97% $H_2SO_4$ per part of Stage I mix. A sample of Stage II mix before the neutralization treatment was frozen and, within a few hours, was analyzed. The analysis showed that it contained 50.7% anionically active ingredient (determined by cationic titration of the unneutralized acidic mix). The infrared absorption spectrum of the Stage II acidic mix indicated that it contained no unreacted olefin but did contain a delta sultone; comparison with the infrared spectrum of a substantially pure delta sultone isolated from a similar Stage II mix made from the same hexadecene-1 feedstock indicated that the Stage II mix contained about 44% of delta sultone. (The 16 carbon sultone used as the reference standard was identified as a delta sultone by its IR spectrum which was characteristic of delta sultone; see the discussion in Example 10.)

In the preferred process illustrated above, the sulfuric acid is incorporated by addition of $H_2SO_4$ to a substantially anhydrous Stage I mix after the initial sulfonation with $SO_3$ has been completed. It is, however, within the broader scope of this invention to add the $H_2SO_4$ earlier in the process or to incorporate all or part of the desired quantity of sulfuric acid in other ways, as by the addition of an equivalent amount of water or suitable salts to react with free sulfur trioxide to form $H_2SO_4$ in situ.

It is generally most economical to use atmospheric pressure for the process, and in the foregoing specific examples the pressure has been atmospheric unless otherwise indicated. It is within the broad scope of this invention to employ subatmospheric pressures or super atmospheric pressures for the various process steps.

In the determination of the anionic active content by titration with cetyl trimethylammonium bromide, there is employed an acidified two-phase mixture containing chloroform, water, methylene blue and the material to be tested. The color concentrates almost exclusively in the lower, chloroform layer. On addition of cetyl trimethylammonium bromide or other long chain cationic reagent and agitation, the color shifts into the upper, aqueous layer; the endpoint of the titration may be taken as the point at which the lower layer is less blue than the upper layer and has a green appearance.

In a typical determination of the free oil content 50 ml. of ethanol was mixed with an amount of neutralized product sufficient to provide 3–5 grams of anionically active material. The blend was then extracted 5 times at room temperature using 50 ml. of petroleum ether or pentane for each extraction.

The bromine number was determined according to A.S.T.M. method D–1158–57T, modified to provide a contact time of 45 minutes instead of 40 seconds. In this A.S.T.M. method, the sample, dissolved in carbon tetrachloride, is treated at room temperature with an excess of bromide bromate solution in the presence of glacial acetic acid. The excess bromine is reduced with potassium iodide and the liberated iodine determined by titration with sodium thiosulphate solution.

In the foregoing examples the yields given and the mole ratios have been based on the moles of total feedstock (not merely on the olefinic content of the feed, which would, of course, give even higher yield values). There was thus practically quantitative conversion of the olefin content of the initial feedstock to anionic active ingredient.

In the accompanying drawings, the spectra, previously described, were recorded with a Perkin-Elmer Model 221 Recording Spectrophotometer using sodium chloride prism system. The spectrum of FIG. 14 was taken on a slurry in light mineral oil; in that figure the broad band at about 2.9 microns and the band at about 6.25 microns are believed to be caused by the presence of residual water and bicarbonate in the sample tested.

As can be seen from Example 16 above, various detergent compositions may be produced from the products of this invention. Additional compositions are disclosed in our application entitled "Treatment of Detergents" previously mentioned and in the copending application 548,825 of ourselves and Raymond C. Odioso entitled "Detergent Bars" filed on even date herewith (whose disclosures are incorporated herein by reference).

Although the present invention has been described with reference to particular embodiments and examples, it will be apparent to those skilled in the art that variations and modifications can be substituted therefor without departing from the principles and true spirit of the invention.

What is claimed is:

1. In the process for the manufacture of higher alkenyl sulfonates by the sulfonation of higher alpha mono-olefins in which process there is produced a sulfonation reaction product containing sultones, said reaction product, when tested by treatment for one half hour with sufficient hot aqueous 30% sodium hydroxide at 90° C. to bring the pH to about 10 to effect neutralization and hydrolysis, being converted to a mixture of water-soluble sodium higher alkenyl sulfonate and water-insoluble oil, the improvement which comprises adding strong sulfuric acid to said reaction product to produce a mixture giving a greater yield of higher alkenyl sulfonates and a lower yield of water-insoluble free oil when tested by said treatment with hot sodium hydroxide, said olefin, said sulfonates, and said sultones containing about 8 to 30 carbon atoms, the sulfuric acid being of at least 50% strength and containing at most an amount of water equal to the weight of $H_2SO_4$, the total amount of water in the resulting mixture being less than 10% of the weight of said sulfonation reaction product.

2. Process as in claim 1 in which the sulfuric acid is of at least 90% strength.

3. Process as in claim 1 in which substantially anhydrous sulfuric acid is added to said sulfonation reaction product.

4. Process as in claim 1 in which on incorporation of said sulfuric acid the amount of water present in said mixture is less than about 3% of the weight of said sulfonation reaction product, the amount of sulfuric acid being in the range of about 2 to 300% of the weight of said sulfonation reaction product.

5. Process as in claim 4 in which said sulfonation reaction mixture is a viscous mixture produced by the continuous reaction, under substantially anhydrous conditions, of a higher alpha olefin in liquid phase with sulfur trioxide supplied as a gas diluted with at least 5 times its volume of an inert gas, the mole ratio of sulfur trioxide to said olefin in said continuous reaction being in the range of about 0.5:1 to 1.3:1.

6. Process as in claim 5 in which said mole ratio is about 1:1.

7. Process as in claim 5 in which said mole ratio is about 0.8:1 to 1.2:1 and the amount of sulfuric acid is in the range of about 2 to 100% of the weight of said sulfonation reaction product, said sulfuric acid being added continuously to a stream of said sulfonation reaction product, the temperature during said reaction with sulfur trioxide being less than 60° C., the temperatures during the treatment with the strong sulfuric acid being less than 70° C. and the duration of the latter treatment being less than about one hour, said temperatures being sufficiently high to maintain said materials in a fluent condition.

8. Process as set forth in claim 1 and including the subsequent step of treating the product with water and a base to effect neutralization and produce the alkenyl sulfonate salt of said base together with free oil.

9. Process as set forth in claim 7 and including the subsequent step of treating the product with water and a sodium-containing base to produce sodium alkenyl sulfonate and free oil.

10. Process for production of a long chain anionically active sulfonic acid which comprises treating with strong sulfuric acid a long chain sultone produced by sulfonation of long chain alpha-olefin to convert said sultone to said long chain anionically active sulfonic acid, said long chain compounds containing about 8 to 30 carbon atoms, said sulfuric acid being of at least 60% strength.

11. Process as in claim 10 in which the sulfuric acid is of at least 90% strength.

12. Process as in claim 11 in which said treatment is carried out at a temperature and pressure at which the sultone is maintained in the liquid state, said process including the subsequent step of neutralizing said active sulfonic acid with a base.

13. Process as in claim 11 in which said sultone is a gamma sultone.

14. Process as set forth in claim 11 in which said sultone is a delta sultone.

15. Process for the production of a long chain anionically active sulfonic acid which comprises treating with strong sulfuric acid a preformed long chain gamma sultone to convert said sultone to said long chain anionically active sulfonic acid, said long chain compounds having about 8 to 30 carbon atoms, said sulfuric acid being of at least 60% strength, said sultone having the structure of a sultone made by reacting an alpha-olefin of 8 to 30 carbon atoms with $SO_3$.

16. Process for the production of a long chain anionically active sulfonic acid which comprises treating with strong sulfuric acid a preformed long chain delta sultone to convert said sultone to said long chain anionically active sulfonic acid, said long chain compounds having about 8 to 30 carbon atoms, said sulfuric acid being of at least 60% strength, said sultone having the structure of a sultone made by reacting an alpha-olefin of 8 to 30 carbon atoms with $SO_3$.

17. Process for the production of a long chain anionically active sulfonic acid which comprises treating with strong sulfuric acid a preformed mixture of a long chain gamma sultone and a long chain delta sultone to convert said sultones to said long chain anionically active sulfonic acid, said sulfuric acid being of at least 60% strength, acid sultones having the structures of gamma and delta sultones made by reacting an alpha-olefin of 8 to 30 carbon atoms with $SO_3$.

18. Process as set forth in claim 12 in which said sultone is present in a mixture containing unsulfonated olefin.

19. Process as set forth in claim 12 in which said sultone is present in a mixture containing long chain alkene sulfonic acid.

20. Process for the production of anionically active sulfoxy-containing acids, which comprises reacting a sulfonatable alpha olefin with less than about 1 mole of sulfur trioxide per mole of olefin to produce a sultone-containing mixture and then reacting said mixture with strong sulfuric acid to convert sultone therein to alkene sulfonic acid and to produce alkyl acid sulfate, said olefin, said sultone, said acid and said sulfate each having about 8 to 30 carbon atoms, said sulfuric acid being of at least 60% strength.

21. A process as in claim 20 in which the sum of the number of moles of sulfuric acid and the number of moles of sulfur trioxide is at least about equal to the number of moles of olefin.

22. A process as set forth in claim 20 in which less than about 0.7 mole of sulfur trioxide are used per mole of alpha-olefin, said process including the step of neutralizing the blend of said alkyl acid sulfate and said alkene sulfonic acid to form water-soluble salts thereof.

23. A process as in claim 10 in which said sultone is present in a mixture containing unsulfonated alpha monoolefin, said sulfuric acid reacting with said unsulfonated olefin to form long chain alkyl sulfate, and in which the product is then neutralized to form a detergent-active salt.

24. Process as set forth in claim 1 in which said reaction product contains gamma and delta sultones and in which the mixture produced by incorporation of sulfuric aci dcontains delta sultone, the ratio of delta sultone to gamma sultone in the latter mixture being above 1:1 and being higher than in said reaction product.

25. Process as set forth in claim 1 in which a phenolic antioxidant is incorporated into the reaction mixture during said process.

26. Process as set forth in claim 25 in which the antioxidant is incorporated by blending it with the mono-olefin.

27. In the process for the manufacture of higher alkenyl sulfonates by the sulfonation reaction of an alpha monoolefin with $SO_3$ diluted with a gas inert to the reaction, said olefin having about 8 to 30 carbon atoms, the improvement which comprises incorporating a phenolic antioxidant into the mono-olefin to be sulfonated.

28. Process as in claim 1 in which said sulfonation of the higher alpha olefin is effected by reacting $SO_3$ with said olefin in a mol ratio of 0.5 to 1.3 mols of $SO_3$ per mol of said olefin and at a temperature of 10 to 60° C., and said sulfuric acid is of at least 60% strength.

29. The neutralized product produced by treating the product of the process of claim 28 with water and a base to effect neutralization and produce the alkenyl sulfonate salt of said base together with free oil.

30. The product of claim 29 in which said base is a sodium-containing base whereby sodium alkenyl sulfonate is produced.

31. Process as in claim 20 in which said reaction of sulfur trioxide and said alpha olefin is effected at a temperature of 10 to 60° C. with at least 0.5 mol of sulfur trioxide per mol of said olefin.

32. A process as set forth in claim 31 in which less than about 0.7 mol of sulfur trioxide are used per mol of alpha olefin, said process including the step of neutralizing the blend of said alkyl acid sulfate and said alkene sulfonic acid to form water-soluble salts thereof.

33. A process as in claim 5 in which said mol ratio is at least about 0.8:1 and the amount of added sulfuric acid is such as to supply up to 0.17 part of added $H_2SO_4$ per part of said reaction product.

34. The acidic product produced by the process of claim 28, in which the sultone content is principally delta sultone.

35. The product of the process of claim 31.

36. The product of the process of claim 32.

References Cited
UNITED STATES PATENTS

| | | | |
|---|---|---|---|
| 2,061,620 | 11/1936 | Downing et al. | 260—513 |
| 2,192,713 | 3/1940 | Mottern | 260—513 |
| 2,454,826 | 11/1948 | Liberthson et al. | 260—504 |
| 2,691,040 | 10/1954 | Bloch et al. | 260—513 |
| 3,164,608 | 1/1965 | Blaser | 260—327 |
| 3,164,609 | 1/1965 | Voss et al. | 260—327 |

JAMES A. PATTEN, *Primary Examiner.*

U.S. Cl. X.R.

260—504, 513, 500; 252—161, 156, 152, 138